(12) United States Patent
James et al.

(10) Patent No.: US 6,905,761 B2
(45) Date of Patent: Jun. 14, 2005

(54) TRANSPARENT FILM-FORMING COMPOSITIONS FOR MAGNETIC RECORDING

(75) Inventors: Robert O. James, Rochester, NY (US); Gregory W. Keyes, Rochester, NY (US); Lawrence A. Rowley, Rochester, NY (US); Daniel F. Hurley, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 123 days.

(21) Appl. No.: 10/317,514

(22) Filed: Dec. 12, 2002

(65) Prior Publication Data

US 2004/0115479 A1 Jun. 17, 2004

(51) Int. Cl.$^7$ .............................. B32B 5/16; G11B 5/66; B05D 5/12; C08K 5/00
(52) U.S. Cl. ..................... 428/323; 428/332; 428/336; 428/694 B; 524/306; 427/128; 427/131
(58) Field of Search .................................. 428/323, 332, 428/336, 694, 694 B; 524/306; 427/128, 131

(56) References Cited

U.S. PATENT DOCUMENTS

| | | |
|---|---|---|
| 3,782,947 A | 1/1974 | Krall |
| 4,299,882 A | 11/1981 | Togawa et al. |
| 4,419,257 A * | 12/1983 | Frew et al. ............... 252/62.54 |
| 4,623,405 A | 11/1986 | Tamai |
| 4,671,993 A | 6/1987 | Kadokura et al. |
| 4,724,162 A | 2/1988 | Saito et al. |
| 4,990,276 A * | 2/1991 | Bishop et al. ........... 252/62.54 |
| 5,217,804 A | 6/1993 | James et al. |
| 5,254,449 A | 10/1993 | James et al. |
| 5,395,743 A * | 3/1995 | Brick et al. ................. 430/496 |
| 5,397,826 A | 3/1995 | Wexler |
| 5,491,051 A | 2/1996 | DeCory et al. |
| 5,709,984 A | 1/1998 | Chen et al. |
| 6,001,550 A | 12/1999 | Yacobucci et al. |
| 6,048,677 A | 4/2000 | Chen et al. |
| 6,075,090 A | 6/2000 | Wang et al. |

FOREIGN PATENT DOCUMENTS

CA  686 172  5/1964

OTHER PUBLICATIONS

Aggregate Exposures to Phthalates in Humans, 1992 (available at on the internet at http://www.fda.gov/ohrms/dockets/dailys/02/Dec02/120502/02d–0325–c000018–02–vol1.pdf).*
Dupont Dibasic Esters, copyright 1995 (available on the internet at http://pubs.acs.org/pin/dupont/dup222p2.html.).*

* cited by examiner

Primary Examiner—Holly Rickman
(74) Attorney, Agent, or Firm—Andrew J. Anderson

(57) ABSTRACT

A concentrated fine solid particle dispersion useful for forming a substantially photographically transparent magnetic recording layer is disclosed, comprising an organic solvent medium containing a dispersing agent and dispersed magnetic particles, wherein the magnetic particles are present at a concentration of at least 25% by weight and the organic solvent medium is comprised primarily of organic solvent selected from dimethyl succinate, dimethyl glutarate and dimethyl adipate. This invention provides a stable concentrated dispersion of magnetic particles useful for preparing substantially photographically transparent magnetic recording layers. A film-forming binder solution can be added to dilute the concentrated dispersion, which then can be applied to a support to form a transparent magnetic layer for a magnetic recording element. This invention also provides a photographic element which contains a magnetic recording layer which has excellent magnetic characteristics and which is substantially photographically transparent by virtue of its low granularity and optical density.

14 Claims, No Drawings

TRANSPARENT FILM-FORMING COMPOSITIONS FOR MAGNETIC RECORDING

FIELD OF THE INVENTION

This invention relates to a stable dispersion of magnetic particles and to a process for the preparation thereof. The invention also relates to a process for applying a magnetic layer to a support and to the resulting magnetic recording element. The invention further relates to a photographic element having a transparent magnetic layer and to a method of making said photographic element.

BACKGROUND

Conventional magnetic recording elements that are used for recording sounds or images are generally opaque to visible light regardless of the nature of the magnetic particles used in such elements. For example, motion picture films often are provided with a magnetic sound track which generally is opaque and does not cover that portion of the film used in the projection of images.

Canadian Patent 686,172 shows that a magnetic recording layer may be transparent to visible light when it contains low concentrations of magnetizable particles. According to this patent, such a layer is coated over a layer containing descriptive material which allows a user to simultaneously hear and see certain subject matter. However, this patent points out that the electromagnetic characteristics, i.e., the magnetic recording and reproducing characteristics, of such a layer are inferior to those of conventional magnetic layers as a result of the very low concentration of magnetizable particles.

U.S. Pat. No. 3,782,947 discloses a photographic product which carries magnetic particles distributed across the image area of the product. The particle distribution and sizes are so designed that the composite granularities of the photographic and magnetic recording media are such that the magnetic distribution is essentially transparent in a photographic sense. The quantity of solvents required, however, is unattractive from both an economic and environmental standpoint. Moreover, it is difficult to prepare magnetic recording layers in such a coating process having a thickness of less than about 5 micrometers.

U.S. Pat. No. 4,279,945 discloses a process of preparing magnetic recording elements containing a transparent recording layer. According to this patent, the magnetic recording and reproducing characteristics obtained are comparable to conventional opaque magnetic layers without the need for matching the granularity of a magnetic medium to that of photographic medium. However, the process requires that the layer containing magnetic particles be treated using one or both of the following process steps, (1) compacting the layer while it is in a malleable state to reduce its thickness (e.g., calendaring), or (2) imbibing into the layer a substantially transparent liquid having a refractive index that is substantially the same as that of the binder. Further, as indicated by the Figure therein, the disclosed magnetic layers are substantially opaque at wavelengths less than about 500 nm and thus are not useful in color films. Further, the disclosed process requires that the magnetic recording layer be calendared while it is in a malleable state and/or that a transparent liquid be imbibed into the magnetic recording layer.

Recent patent literature has disclosed commercially viable technologies for a photographic element having a transparent magnetic recording layer for information and data recording and reading purposes. For example, U.S. Pat. Nos. 4,990,276, 5,254,449, 5,427,900 and 5,432,050 describe transparent magnetic recording layers for use in photographic elements wherein organic solvents are used for the preparation of a dispersion containing the magnetic particles. U.S. Pat. No. 4,990,276 in particular discloses the preparation of transparent magnetic recording layers wherein a concentrated dispersion of magnetic oxide particles, a dialkylester of phthalic acid and a dispersing agent, is first formed, which is then diluted with a binder solution to form a composition suitable for coating or casting. The use of dialkylesters of phthalic acid, such as dibutyl phthalate, has been found to be particularly advantageous in the preparation of relatively concentrated magnetic oxide particle dispersions, which upon dilution allow for the formation of transparent magnetic coating compositions substantially free of unacceptable magnetic particle agglomeration and light scattering. In commercial applications of the disclosed process, coating dispersions for transparent magnetic recording layers use pre-dispersed concentrated magnetic oxide compositions (e.g., typically at least 25 weight percent magnetic oxide particle) which are let-down in successive steps to form the coating solution. The first stage is making "grind" or concentrated oxide dispersions in solvent with a dispersant. The magnetic oxide grind is then typically letdown from about 40 to 55% oxide to about 1 to 3% in a stabilizing, film-forming polymer solution termed an "intermediate letdown" which desirably has good shelf-life and colloid stability. Finally, the coating dispersion is made up from binder polymer solutions, the magnetic intermediate, and any additive solutions or particle dispersions and trim solvent amounts.

In commercial applications, a concentrated magnetic oxide particle dispersion similar to that prepared in Examples 1 or 2 of U.S. Pat. No. 4,990,276 may be diluted with cellulose diacetate/cellulose triacetate solutions to the following composition using a high shear mixer for the dilution procedure.

| Coating Composition | |
| --- | --- |
| Ingredients | Weight Percent |
| Methylene chloride | 67.84 |
| Acetone | 24.224 |
| Methyl acetoacetate | 4.844 |
| Cellulose diacetate | 2.6 |
| Cellulose triacetate | 0.12 |
| Dibutyl phthalate | 0.234 |
| GAFAC PE-510 (GAF Corp.) dispersing agent | 0.006 |
| Co-$\gamma$-Fe$_2$O$_3$ magnetic oxide particles | 0.12 |
| Fluorad FC-431 (3M Corp) coating aid | 0.012 |

This coating composition typically may be cast onto subbed polyethylene naphthalate to a dry thickness of about 1.2 microns of cellulose acetate binders containing uniformly dispersed magnetic particles at a laydown of from about 20 mg/m$^2$ to 100 mg/m$^2$. This composition at 3.1% w/w solids coated at the rate of 49.5 g/m$^2$, for example, provides a dry laydown of 1535 mg/m$^2$ and a magnetic particle laydown of 59.4 mg/m$^2$. At these levels of magnetic oxide, coded information can be written and read from the magnetic layers by use of suitable write/playback heads.

While the use of dialkylesters of phthalic acid such as dibutyl phthalate as grind solvents in the preparation of transparent magnetic coating compositions only requires a minor amount of such materials relative to the final coated material (e.g., only about 0.05% w/w of a photographic film roll), for environmental reasons it may be desirable to reformulate the magnetic coating compositions to be essentially free of aromatic di-ester plasticizers. In order to remove the minor amounts of dibutyl phthalate from the transparent recording layer compositions, it would be desirable to provide a functional, cost effective and environmentally benign replacement solvent.

Various conventional solvents or co-solvents have been suggested for use in preparation of magnetic particle dispersions to form coating dispersions and subsequently, either transparent or non-transparent recording layers, including toluene (methyl benzene) and ketones (e.g., methyl ethyl ketone (MEK), methyl isobutyl ketone (MIBK)). While these volatile solvents are capable of providing similar quality results when used as a grind solvent along with a dispersing agent, they have much lower boiling points, flash points and higher odor levels than dibutyl phthalate. The low flashpoint, flammability and higher odor level mean that while these solvents may be functional, they are not as suitable as desired from the manufacturing robustness, safety and capital cost issues.

U.S. Pat. No. 4,419,257 discloses the use of cellosolve/dibasic ester solvent combinations in the preparation of magnetic layer coating compositions designed to have particular solubility parameters after 99% of the solvent is evaporated from the coating layer binder. While dimethyl succinate, dimethyl glutarate and dimethyl adipate are mentioned as dibasic esters, there is no disclosure or suggestion for the use of such materials as the major solvent in the preparation of a magnetic particle grind dispersion in the preparation of a transparent magnetic layer coating composition.

U.S. Pat. Nos. 5,395,743, 5,397,826 and U.S. Pat. No. 5,491,051 disclose the use of methyl acetoacetate in the preparation of a dispersion of magnetic or abrasive particles for use in magnetic recording layers. However, it has been found that methyl acetoacetate appears to react with the iron in the magnetic pigment to result in a reddish colored complex and is therefore not desirable for use as a grind solvent in the preparation of concentrated magnetic particle dispersions for use in transparent magnetic recording layer compositions.

PROBLEM TO BE SOLVED BY THE INVENTION

It would be desirable to eliminate the use of dibutyl phthalate solvent as the primary magnetic particle dispersion grind solvent in making a magnetic recording element, in particular a photographic element, such as a film, having a photographically transparent magnetic layer while still maintaining the optical quality of the photographic element. Further, it would be desirable to provide a stable concentrated dispersion of magnetic particles from which to prepare such an element. It would also be desirable to be able to avoid the use of other aromatic di-alkyl esters as grind solvents for the preparation of magnetic particle dispersions.

SUMMARY OF THE INVENTION

Accordingly, one aspect of this invention comprises a concentrated fine solid particle dispersion useful for forming a substantially photographically transparent magnetic recording layer, comprising an organic solvent medium containing a dispersing agent and dispersed magnetic particles, wherein the magnetic particles are present at a concentration of at least 25% by weight and the organic solvent medium is comprised primarily of organic solvent selected from dimethyl succinate, dimethyl glutarate and dimethyl adipate.

Another aspect of this invention comprises a process for the preparation of a concentrated fine solid particle dispersion of magnetic particles in accordance with claim 1 useful for forming a magnetic recording layer, which comprises: (a) forming a slurry of at least 25 weight percent solid magnetic particles and a dispersing agent in an organic solvent medium comprised primarily of organic solvent selected from dimethyl succinate, dimethyl glutarate and dimethyl adipate; and (b) milling the slurry for a period of time sufficient to ensure that substantially no agglomerates of the magnetic particles are present. A further aspect of the invention comprises such a process, further comprising (c) mixing a solution of a film-forming polymeric binder with the milled concentrated magnetic particle dispersion to form a composition comprising less than 25 weight percent magnetic particles.

A further aspect of this invention comprises a magnetic recording element comprising a support and a transparent magnetic recording layer coated thereon, wherein the recording layer is prepared by combining a film-forming binder and a dispersion of magnetic particles in accordance with the invention to form a coating composition and applying said coating composition onto the support.

Yet another aspect of this invention comprises a process for preparing a magnetic recording element which comprises the steps of combining a film-forming binder and a dispersion of magnetic particles in accordance with the invention to form a coating composition and applying the resulting composition onto a support.

A still further aspect of this invention comprises a photographic element comprising a photographic support, a light sensitive layer and a substantially photographically transparent magnetic recording layer, wherein the magnetic recording layer is prepared by combining a film-forming binder and a dispersion of magnetic particles in accordance with the invention to form a coating composition and applying said coating composition onto said photographic support.

Another aspect of this invention comprises a process for preparing a photographic element having a substantially photographically transparent magnetic recording layer which comprises combining a film-forming binder and a dispersion of magnetic particles in accordance with the invention to form a coating composition and applying said composition onto a photographic support.

ADVANTAGEOUS EFFECT OF THE INVENTION

This invention provides a stable concentrated dispersion of magnetic particles useful for preparing substantially photographically transparent magnetic recording layers. A film-forming binder solution can be added to dilute the concentrated dispersion, which then can be applied to a support to form a transparent magnetic layer for a magnetic recording element. This invention also provides a photographic element which contains a magnetic recording layer which has excellent magnetic characteristics and which is substantially photographically transparent by virtue of its low granularity and optical density. The solvent system used to prepare the concentrated dispersion is environmentally benign compared to dispersions prepared with dibutyl phthalate as the primary organic solvent.

DETAILED DESCRIPTION OF THE INVENTION

This invention relates to preparation of substantially transparent layers containing magnetic particles, the layers being capable of having coded information written and read therefrom. The transparent layers containing magnetic particles in accordance with this invention are particularly applicable for use in combination with photographic elements wherein information can be written into the magnetic layer without affecting the quality and performance of the light-sensitive photographic elements. It is a feature of preferred embodiments of this invention that transparent magnetic layers may be prepared from a stable dispersion of magnetic particles which contains substantially no dibutyl phthalate organic solvent.

In accordance with the invention, transparent magnetic layer may be prepared by initially forming a high solids content magnetic concentrate (at least 25 weight percent magnetic particles, preferably at least 49 weight percent magnetic particles) by mixing the magnetic particles in an organic solvent medium (also referred to as a grind solvent) together with suitable surfactants and milling in a device such as, for example, a ball mill, a roll mill, a high speed impeller mill, media mill, an attritor or a sand mill, wherein the organic solvent medium is comprised primarily of organic solvent selected from dimethyl succinate, dimethyl glutarate and dimethyl adipate. Maximum concentration of dispersed solids will in general depend upon the particular mixing apparatus and dispersing agents used as well as the solvent, but concentrations typically will reach a viscosity limited maximum at between 50 to 75 weight percent. It is an advantage of the invention that the aliphatic dibasic ester solvents are of lower viscosity than dibutyl phthalate, and allow for an approximately 20% productivity improvement with respect to maximum concentration of magnetic particles in the grind dispersion under comparable manufacturing conditions. Aliphatic dibasic ester solvents employed as grind solvents in accordance with the invention have boiling points of from about 195 to 230 C, which are intermediate the relatively low boiling ketones and high boiling aromatic diesters. In a preferred embodiment, the organic solvent medium is comprised primarily of organic solvent selected from dimethyl glutarate and dimethyl adipate, as dimethyl succinate has an unusually high melting point (about 16 C) relative to that of dimethyl glutarate and dimethyl adipate (about −30 C), which higher melting point may lead to freezing of the grind dispersion in cold storage or transport in cold environments. In a particularly preferred embodiment the organic solvent medium is comprised primarily dimethyl glutarate, which has a lower boiling point compared to dimethyl adipate, which therefore allows more of the grind solvent to be volatilized during drying of the coated solution, providing lower retained solvent levels in the product. While other solvents may be used in combination with the primary solvent in accordance with the invention, the organic solvent medium preferably contains substantially no dibutyl phthalate or other phthalate acid esters.

Milling of the concentrated dispersions in accordance with the invention proceeds for a sufficient time to ensure that substantially no agglomerates of the magnetic particles remain. The length of time required depends on the particular milling device used. In general, milling time depends on the residence time determined according to whether batch passes or continuous, re-circulation milling is used; the media density and its volume loading, mill rpm and tip speed. In general, milling should be continued from about 0.5 to about 16 hours, preferably from about 1 to about 10 hours, with preferred residence times from 20 minutes to about 60 minutes.

The magnetic particles may comprise, for example, fine ferri- and ferro-magnetic powders such as ferrimagnetic gamma-iron oxides, cobalt surface-treated ferrimagnetic iron oxides, cobalt-doped ferrimagnetic iron oxides, cobalt containing $Fe_2O_3$, ferrimagnetic magnetites, cobalt-containing ferrimagnetic magnetites, ferrimagnetic chromium dioxides, ferromagnetic metal powders, ferromagnetic iron powders, ferromagnetic alloy powders and the class of ferrimagnetic ferrite powders including barium ferrites. Additionally, the above mentioned powder particles may be modified to provide lower light extinction and scattering coefficients by providing them with a shell, of at least the same volume as the magnetic core, of a low refractive index material that has its refractive index lower than the transparent polymeric material used to form the magnetizable layer. Typical shell materials may include amorphous silica, vitreous silica, glass, calcium fluoride, magnesium fluoride, lithium fluoride, polytetrafluoroethylene and fluorinated resins. Examples of the ferromagnetic alloy powders include those comprising at least 75% by weight of metals which comprise at least 80% by weight of at least one ferromagnetic metal alloy (such as Fe, Co, Ni, Fe—Co, Fe—Ni, Co—Ni, Co—Ni—Fe) and 20% or less of other components (such as Al, Si, S, Sc, Ti, V, Cr, Mn, Cu, Zn, Y, Mo, Rh, Re, Pd, Ag, Sn, B, Ba, Ta, W, Au, Hg, Pb, La, Ce, Pr, Nd, Te, and Bi). The ferromagnetic metals may contain a small amount of water, a hydroxide or an oxide. In addition, magnetic oxides with a thicker layer of lower refractive index oxide or other material having a lower optical scattering cross section as taught in U.S. Pat. No. 5,252,444 may also be used.

The dispersion in accordance with this invention contains magnetic particles which preferably are acicular or needle like magnetic particles. The average length of these particles along the major axis preferably is less than about 0.3, more preferably, less than about 0.2 micron. The particles preferably exhibit an axial ratio, that is, a length to diameter thickness ratio of up to about 5 or 6 to 1. Preferred particles have a specific surface area of at least 30 $m^2/g$, more preferably of at least 40 $m^2/g$. Typical acicular particles of this type include for example, particles of ferro- and ferrimagnetic materials such as γ-ferric oxide, complex oxides of iron and cobalt, various ferrites and metallic iron pigments. Alternatively, small tabular particles such as barium ferrites and the like can be employed. The particles can be doped with one or more ions of a polyvalent metal such as titanium, tin, cobalt, nickel, zinc, manganese, chromium, or the like as is known in the art.

A preferred particle consists of Co surface treated $\gamma$-$Fe_2O_3$ having a specific surface area of greater than 40 $m^2/g$. Particles of this type are commercially available and can be obtained, e.g., from Toda Kogyo Corporation under the trade names CSF 4085V2, CSF 4565V, CSF 4585V and CND 865V and from Pfizer Pigments Inc. under the trade designations RPX-4392, RPX-5003, RPX-5026 and RPX-5012. For good magnetic recording, the magnetic particles preferably exhibit coercive force above about 500 Oe and saturation magnetization above 70 emu/g.

The concentrated dispersions prepared in accordance with the invention contain a dispersing agent, sometimes referred to as a wetting agent or a surface active agent, to facilitate dispersion of the magnetic particles and/or wetting of the particles with the dispersing medium. This helps to minimize agglomeration of the magnetic particles. The dispersing agent can be present in the concentrated dispersion at any practical amount, typically up to about 25% by weight, and preferably 0.1 to 15% by weight. Useful dispersing agents include fatty acid amines, polyvinyl pyrrolidone, polyvinyl alcohol and commercially available wetting agents such as Witco Emcol CC59 which is a quaternary amine available from Witco Chemical Corp.; Rhodafac PE 510, Rhodafac RE 610, Rhodafac RE 960, and Rhodafac LO 529 which are phosphoric acid esters available from Rhone-Poulenc, and Solsperse 24000 which is a polyester-polyamine sold by Zeneca-Inc. (ICI). Poly ($C_{2-4}$-alkyleneimine) polymeric dispersants carrying at least two mono- or poly-(carbonyl-$C_{1-7}$-alkyleneoxy) groups are preferred dispersing agents for use in accordance with the invention, of which Solsperse 24000 is an example as described in U.S. Pat. No. 5,395,743, which is incorporated herein in its entirety by reference.

The high solids magnetic concentrate next may be diluted to a concentration of less than 25 weight percent magnetic particles, preferably less than 10 weight percent and more preferably less than 5 weight percent, with suitable solvents and polymeric stabilizers to maintain the particles in an unagglomerated state (subsequently referred to as an intermediate letdown). Mixing for an additional period of time may be continued in order to polish the ingredients. A preferred stabilizing polymer for the intermediate dispersion dilution step is cellulose triacetate dissolved in dichloromethane. To prepare a coating composition which may be used for forming a magnetic recording layer, a polymeric film-forming binder may be combined with the magnetic particle dispersion, along with coating aids and solvent for the binder. Typically, the binder polymer is dissolved in a suitable solvent, and to this solution is added the intermediate letdown prepared in accordance with the procedure set forth above and stirring is continued. Additional components may also be added to the coating composition, such as a dispersion of small (e.g., less than 0.4 micrometer) reinforcing filler particles or other addenda such as described, e.g., in U.S. Pat. Nos. 5,432,050, 5,434,037, 5,436,120, and 5,800,973, which may also be pre-dispersed and then added to the mixer containing the binder solution and intermediate letdown. These additional component particles may provide, e.g., controlled surface texture and scratch or abrasion resistance to the coatings.

Polymeric film-forming binders which may be used in the magnetic layer include, for example, vinyl chloride-vinyl acetate copolymers, vinyl chloride-vinyl acetate-vinyl alcohol copolymers, vinyl chloride-vinyl acetate-maleic acid polymers, vinyl chloride-vinylidene chloride copolymers, vinyl chloride-acrylonitrile copolymers, acrylic ester-acrylonitrile copolymers, acrylic estervinylidene chloride copolymers, methacrylic estervinylidene chloride copolymers, methacrylic esterstyrene copolymers, thermoplastic polyurethane resins, phenoxy resins, polyvinyl fluoride, vinylidene, chloride-acrylonitrile copolymers, butadieneacrylonitrile copolymers, acrylonitrile-butadieneacrylic acid copolymers, acrylonitrile-butadienemethacrylic acid copolymers, polyvinyl butyral, polyvinyl acetal, cellulose derivatives, styrenebutadiene copolymers, polyester resins, phenolic resins, epoxy resins, thermosetting polyurethane resins, urea resins, melamine resins, alkyl resins, urea-formaldehyde resins and the like. Of the above, the cellulose derivatives are the preferred binders for use in accordance with this invention. Cellulose derivatives include cellulose esters such as, for example, cellulose acetate, cellulose diacetate, cellulose triacetate, cellulose acetate butyrate, cellulose acetate propionate, and the like. The most preferred binder is cellulose diacetate. For crosslinking of the binder with isocyanates, the binder should contain active hydrogen atoms as determined by the Zerewitinoff test, such active hydrogen atoms including —OH, —$NH_2$, —NHR, where R is an organic radical, and the like, as described in U.S. Pat. No. 3,479,310. Aromatic polyester binders having a Tg of greater than 150 C as described in U.S. Pat. No. 6,001,550, the disclosure of which is incorporated by reference herein, may also be preferred.

Organic solvents which may be used to dissolve the polymeric binder and as a coating solvent in the preparation of the magnetic layer coating compositions include ketones, such as acetone, methyl ethyl ketone and cyclohexanone, alcohols, esters, such as ethyl acetate and butyl acetate, cellosolves, such as propylene glycol methyl ether, ethers, aromatic solvents, such as toluene, and chlorinated hydrocarbons solvents, such as carbon tetrachloride, chloroform, dichloromethane; tetrahydrofuran and the ketoesters of U.S. Pat. No. 5,397,826.

Preferably, the binder in the magnetic layer coating composition is crosslinkable employing any suitable crosslinking agent such as, for example, organic isocyanates; aziridines, as taught in U.S. Pat. No. 4,225,665; and melamines such as methoxymethylmelamine, and the like as set forth in U.S. Pat. No. 5,198,499. Any suitable organic polyisocyanate can be used as the crosslinking agent such as, tetramethylene diisocyanate, hexamethylene diisocyanate, diisocyanato dimethylcyclohexane, dicyclohexylmethane diisocyanate, isophorone diisocyanate, dimethylbenzene diisocyanate, methylcyclohexylene diisocyanate, lysine diisocyanate, tolylene diisocyanate, diphenylmethane diisocyanate, polymers of the foregoing, polyisocyanates prepared by reacting an excess of an organic diisocyanate with an active hydrogen containing compounds such as polyols, polyethers and polyesters and the like including ethylene glycol, propylene glycol, dipropylene glycol, butylene glycol, trimethylol propane, hexanetriol, glycerine, sorbitol, pentaerythritol, caster oil, ethylenediamine, hexamethylenediamine, ethanolamine, diethanolamine, triethanolamine, water, ammonia, urea and the like, including biuret compounds, allophanate compounds and the like. The preferred polyisocyanates employed as a crosslinking agent is the reaction product of trimethylol propane and 2,4-tolylene diisocyanate sold by Mobay under the trade designation Mondur CB 75.

Suitable coating aids which may be added to the coating compositions include nonionic fluorinated alkyl esters such as Fluorad FC-430, FC-431, FC-10, FC-171 sold by Minnesota Mining and Manufacturing Co., Zonyl fluorochemicals such as Zonyl-FSN, Zonyl-FTS, Zonyl-TBS, Zonyl-BA sold by DuPont; fluorinated surfactants sold by Elf Atochem under the tradename FORAFAC; polysiloxanes such as Dow Corning DC 1248, DC200, DC510, DC 190 and BYK 320, BYK 322, sold by BYK Chemie and SF 1079, SF1023, SF 1054, and SF 1080 sold by General Electric; polyoxyethylene-lauryl ether surfactants sold by Eastman Chemical Co.; sorbitan laurate, palmitate and stearates such as Span surfactants sold by Aldrich.

The resulting coating composition may be coated onto a suitable support in its present form or additional and optional ingredients such as, crosslinking or hardening agents, catalysts, coating aids, abrasive particles, lubricants, matting agents, antistatic agents, fillers and the like, may be added before the coating operation. The thickness of the magnetic layer preferably should be from about 0.5 to about 5 micrometers, more preferably about 0.5 to about 3 micrometers, and most preferably about 0.5 to about 2 micrometers. The coating composition is applied to a suitable support which may contain additional layers for promoting adhesion, by any suitable coating device including slot die hoppers, slide hoppers, gravure coaters, reverse roll coaters and the like. As is taught in U.S. Pat. No. 3,782,947 noted above, whether an element is useful for both photographic and magnetic recording depends on both the size distribution and concentration of the magnetic particles and on the relationship between the granularities of the magnetic and photographic coatings. Generally, of course, the coarser the grain of the emulsion in the photographic element that contains the magnetic recording layer, the larger the mean size of the magnetic particles which can be tolerated. A magnetic particle concentration between about 10 and 1000 $mg/m^2$ when uniformly distributed across the desired area of the photographic element will be sufficiently photographically transparent provided that the maximum particle size is less than about 1 micron, with coverages of from about 10 $mg/m^2$ to 100 $mg/m^2$ being more preferred. Particle concentrations less than about 10 $mg/m^2$ tend to be insufficient for magnetic recording purposes and particle concentrations greater than about 1000 $mg/m^2$ tend to be too dense for photographic purposes. Particularly useful particle concentrations are in the range of 20–70 $mg/m^2$. Concentrations of about 20 $mg/m^2$ have been found to be particularly useful in reversal films and concentrations of about 50 $mg/m^2$ are particularly useful in negative films. For optimum performance, the magnetic recording layer should be such that normal wear will not result in signal loss after multiple reading and writing operations. However, the layer must not be so thick as to interfere with the photographic properties of the film. Accordingly, the magnetic particles are preferably present in the magnetic recording layer in an amount of from about 2.5 to about 10 percent by weight based upon the weight of film-forming binder. Additional materials may also be incorporated in the magnetic recording layer, such as small (including nanoparticulate) reinforcing filler particles and/or abrasive particles.

Examples of abrasive and/or reinforcing filler particles include nonmagnetic inorganic powders with a Mohs scale hardness of not less than 6. Specific examples are metal oxides such as alpha-alumina, chromium oxide (e.g., $Cr_2O_3$), iron oxide (e.g., alpha-$Fe_2O_3$), silicon dioxide, alumino-silicate and titanium dioxide; carbides such as silicon carbide and titanium carbide; nitrides such as, silicon nitride, titanium nitride; tin oxide, doped tin oxide, such as antimony or indium doped tin oxide; metal antimonates such as zinc antimonate and indium antimonate; and diamond in fine powder. The abrasive and reinforcing filler particles can be pre-dispersed using the same dispersants and solvents as described in this invention and then incorporated into the coating composition. Reinforcing filler particles useful in transparent magnetic recording layers preferably have a median diameter less than 0.15 micrometer, more preferably less than 0.1 micrometer and most preferably less than 0.08 micrometer. The filler particles are preferably present in an amount of from 20 to 300 percent by weight, more preferably from 50 to 120 percent and most preferably from 65 to 85 percent based on the weight of the binder. Abrasive particles include those having a median particle diameter of from about 0.1 to 0.4 micrometer and preferably may be present in an effective amount to aid in the cleaning of the magnetic heads. Generally, the abrasive particles are present in an amount of from 1 to 20 percent by weight, and preferably 1 to 7 percent by weight based on the weight of the binder present. The most preferred abrasives are $\alpha$-$Al_2O_3$ and silicon dioxide.

Tin oxide particles in any form may be employed such as tin oxide per se or doped tin oxides, such as, antimony or indium doped tin oxide. The tin oxides and metal antimonates referred to above may be used in either the conductive or non-conductive form; however, when in the conductive form, an additional advantage is gained in that the layer also acts as an antistat. Suitable conductive particles are disclosed in U.S. Pat. Nos. 4,495,276; 4,394,441; 4,431,764; 4,418,141 and 4,999,276. Useful tin oxide particles are commercially available from Keeling and Walker, Ltd. under the trade designation Stanostat CPM 375; DuPont Co. under the trade designation Zelec-ECP 3005XC and 3010SC and Mitsubishi Metals Corp. under the trade designation T-1. Preferred metal antimonates include those having rutile or rutile-related crystallographic structures as disclosed in U.S. Pat. No. 5,368,995.

The magnetic layer may also be coated over or overcoated with conventional layers including antistats, protective overcoats, lubricants and the like. However, the preferred configuration of layers is that an antistat layer is beneath the magnetic layer (closer to the support) and the magnetic layer is overcoated with a thin (e.g., less than 0.4 micrometer, preferably less than 0.2 micrometer) protective layer and/or a lubricating layer.

Any suitable support may be employed in the practice of this invention, such as, cellulose derivatives including cellulose diacetate, cellulose triacetate, cellulose propionate, cellulose butyrate, cellulose acetatepropionate and the like; polyamides; polycarbonates; polyesters, particularly polyethylene terephthalate, poly-1,4-cyclohexanedimethylene terephthalate, polyethylene 1,2-diphenoxyethane-4,4'-dicarboxylate, polybutylene terephthalate and polyethylene naphthalate; polystyrene, polypropylene, polyethylene, polymethyl-pentene, polysulfone, polyethersulfone, polyarylates, polyether imides and the like. Particularly preferred supports are polyethylene terephthalate, polyethylene naphthalate and the cellulose esters particularly cellulose triacetate. Thickness of supports used in the present invention is preferably from about 50 to 180 micrometers, more preferably from about 70 to 110 micrometers. In addition, various dyes may be formulated into the support or the magnetic layer to give neutral density. Depending upon the nature of the support, suitable transparent tie or undercoat layers may be desired. Particularly with regard to polyester supports, primers are used in order to promote adhesion. Any suitable primer in accordance with those described in the following U.S. patents, e.g., maybe employed: U.S. Pat. Nos. 2,627,088; 3,501,301; 4,689,359; 4,363,872; and 4,098,952. Each of these are incorporated herein by reference in their entirety.

In a preferred embodiment of the invention, the magnetic recording layer may be applied over an antistat layer which is employed to dissipate static charges. A very wide variety of antistatic layers are known for use in photographic elements. For example, an antistatic layer comprising an alkali metal salt of a copolymer of styrene and styrylundecanoic acid is disclosed in U.S. Pat. No. 3,033,679. Photographic films having a metal halide, such as sodium chloride or potassium chloride, as the conducting material, in a hardened polyvinyl alcohol binder are described in U.S. Pat. No. 3,437,484. In U.S. Pat. No. 3,525,621, the antistatic layer is comprised of colloidal silica and an organic antistatic agent, such as an alkali metal salt of an alkylaryl polyether sulfonate, an alkali metal salt of an arylsulfonic acid, or an alkali metal salt of a polymeric carboxylic acid. An antistatic layer comprised of an anionic film forming polyelectrolyte, colloidal silica and a polyalkylene oxide is disclosed in U.S. Pat. No. 3,630,740. In U.S. Pat. No. 3,681,070, an antistatic layer is described in which the antistatic agent is a copolymer of styrene and styrene sulfonic acid. U.S. Pat. No. 4,542,095 describes antistatic compositions comprising a binder, a nonionic surface-active polymer having polymerized alkylene oxide monomers and an alkali metal salt. In U.S. Pat. No. 4,916,011, an antistatic layer comprising a styrene sulfonate-maleic acid copolymer, a latex binder, and an alkyl-substituted trifunctional aziridine crosslinking agent are disclosed. An antistatic layer comprising a vanadium pentoxide colloidal gel is described in U.S. Pat. No. 4,203,769. U.S. Pat. Nos. 4,237,194; 4,308,332; and 4,526,706 describe antistats based on polyaniline salt-containing layers. Crosslinked vinylbenzyl quaternary ammonium polymer antistatic layers are described in U.S. Pat. No. 4,070,189. Antistat layers comprising a polythiophene with conjugated polymer backbone in the presence of a polymeric polyanion compound are described in EP 554,588; EP 553,502; EP 564,911; DE 4,138,628. Preferred electronically conductive polymers include 3,4-dialkoxy substituted styrene sulfonate, polypyrrole styrene sulfonate or 3,4-dialkoxy substituted polypyrrole styrene sulfonate. Conductive metal oxides including tin oxides mentioned previously with respect to reinforcing filler may also be employed to form an antistat layer beneath or over the magnetic recording layer.

Antistat layers may be classified as process surviving and non-process surviving. This designation relates to whether or not the conductive properties of the antistat layer survives the processing solutions used in the development of the photographic film. When non-process surviving antistat layers, such as, vanadium pentoxide layers are used and antistat properties are desired on the developed film, the antistat layer may be overcoated with a barrier layer as described in U.S. Pat. Nos. 5,006,451 and 5,221,598. When a magnetic recording layer free of reinforcing filler is applied over a non-process surviving antistat layer, the magnetic layer will inherently serve as a barrier layer for the antistat layer. However, a magnetic recording layer containing reinforcing filler may not function as well for this purpose. By crosslinking the binder, however, barrier properties may be re-established. Thus, crosslinking the polymeric binder of the magnetic recording layer is highly preferred especially when positioned over an antistat layer.

Elements having a magnetic recording layer in accordance to this invention can be provided with a protective or lubricating layer, such as a wax layer, in or over the transparent magnetic recording layer. Suitable lubricants include silicone oil, silicones having polar groups, fatty acid-modified silicones, fluorine-containing silicones, fluorine-containing alcohols, fluorine-containing esters, polyolefins, polyglycols alkyl phosphates and alkali metal salts thereof, alkyl sulfates and alkali metal salts thereof, polyphenyl ethers, fluorine-containing alkyl sulfates and alkali metal salts thereof, monobasic fatty acids having 10 to 24 carbon atoms (which may contain unsaturated bonds or may be branched) and metal salts thereof (such as Li, Na, K and Cu), monovalent, divalent, trivalent, tetravalent, pentavalent and hexavalent alcohols having 12 to 22 carbon atoms (which may contain unsaturated bonds or may be branched), alkoxy alcohols having 12 to 22 carbon atoms, mono-, di- and tri-esters of monobasic fatty acids having 10 to 24 carbon atoms (which may contain unsaturated bonds or may be branched) and one of monovalent, divalent, trivalent, tetravalent, pentavalent and hexavalent alcohols having 2 to 12 carbon atoms (which may contain unsaturated bonds or may be branched), fatty acid esters of monoalkyl ethers of alkylene oxide polymers, fatty acid amides having 8 to 22 carbon atoms and aliphatic amines having 8 to 22 carbon atoms. Specific examples of these compounds (i.e., alcohols, acids or esters) include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, pentaerythrityl tetrastearate, oleyl alcohol and lauryl alcohol. Carnauba wax is preferred. The use of composite core/shell particles comprising wax cores and polymeric shells in a lubricant layer such as described in U.S. Pat. Nos. 5,695,919, 6,075,090 and 6,048,677 is also specifically contemplated. Additional specifically contemplated lubricant materials include those described in U.S. Pat. Nos. 5,817,451, 6,048,677, and 6,174,661.

The primary utility for transparent magnetic recording layers is in the photographic industry wherein a photographic film can be built onto a substrate that includes a transparent recording layer. The transparent magnetic recording layer may be disposed in any position relative to the various layers of the photographic film including over the light sensitive layers, within the layers, within the base substrate, however, it is preferred that the transparent magnetic layer be applied as a layer on the side opposite the light-sensitive layers of the photographic film. This provides ease of encoding and readout. This can be achieved by coating applications widely known in both the photographic and magnetic recording fields of technology. Generally, the photographic element is prepared by coating the support film on the side opposite the magnetic recording layer with one or more layers comprising a dispersion of silver halide crystals in an aqueous solution of gelatin and optionally one or more subbing layers, such as, for example, gelatin, etc. The coating process can be carried out on a continuously operating machine wherein a single layer or a plurality of layers are applied to the support. For multicolor elements, layers can be coated simultaneously on the composite support film as described in U.S. Pat. No. 2,761,791 and U.S. Pat. No. 3,508,947. Additional useful coating and drying procedures are described in Research Disclosure, Vol. 176, December 1978, Item 17643. Suitable photosensitive image forming layers are those which provide color or black and white images. Information can then be encoded into the magnetic layer during all steps of the preparation of the photographic product. This can include manufacturing data with regard to the various layers that are employed during the preparation of the film, information with regard to the properties of the various layers built onto the substrate and the like. Further, after the film is completed and is being used by the consumer, many and various applications can be envisioned wherein information is included in the magnetic layer that is helpful to the photographer, the developing laboratory and others engaged in this field of endeavor. For example, when a camera also has the capability of imparting data to a magnetic layer by having built in recording heads in the camera, information with regard to each frame of the film can be recorded, such as, the light conditions, the speed at which the frame is exposed, the F-Stop number and the like.

Photographic elements in accordance with certain embodiments of this invention comprise at least one photosensitive layer. In a particularly preferred embodiment, the imaging elements of this invention are photographic elements, such as photographic films, photographic papers or photographic glass plates, in which the image-forming layer is a radiation-sensitive silver halide emulsion layer. Such emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly(vinylpyrrolidone), and the like.

The photographic elements employing a magnetic recording layer prepared in accordance with the present invention can be simple black-and-white or monochrome elements comprising a support bearing a layer of light-sensitive silver halide emulsion or they can be multilayer and/or multicolor elements. Color photographic elements typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art. A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material. In addition to emulsion layers, the photographic elements of the present invention can contain one or more auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like.

The light-sensitive silver halide emulsions employed in the photographic elements can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in Research Disclosure, Item 36544, September, 1994, and the references listed therein. The photographic silver halide emulsions utilized in this invention can contain other addenda conventional in the photographic art. Useful addenda are described, for example, in Research Disclosure, Item 36544, September, 1994. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired. Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers that form magenta dye images are pyrazolones and pyrazolotriazoles. Preferred couplers that form yellow dye images are benzoylacetanilides and pivalylacetanilides.

EXAMPLE 1

Grind Dispersion Preparation:

A 1 kg batch of concentrated magnetic particle grind dispersion was made with the following formula:

| Components | Amount (g) |
| --- | --- |
| Magnetic Co-γ-$Fe_2O_3$ CSF4085-V2 (Toda Kogyo) | 550 g |
| Solsperse 24000 (Avecia) | 55 g |
| di-methyl glutarate (DuPont DBE-5) solvent | 395 g |
| Total | 1,000 g |

First a magnetic particle slurry was prepared by dissolving 55 g of the dispersing agent (Solsperse 24000 granules) in 395 g of warmed (90° F.) di-methyl glutarate in a 1 liter capacity metal pot, and then adding 550 g of Co-γ-$Fe_2O_3$ magnetic oxide powder (CSF4085-V2 from Toda Kogyo). The particles were "wet-out" with a 2 inch diameter Cowles blade driven by an air motor for ½ hr to form a flowing slurry. This slurry was then poured into the funnel of a 250 cc Eiger Mill. The Eiger mill was charged with a 85% loading of 1.0 mm diameter Chromanite steel media. The Eiger is water jacketed with 55° F. cooling water. The mill was then run 4,000 rpms for 7 hours. Duration or time of milling to form a dispersion free of agglomerates was determined by microscopic inspection of the slurry prepared as a thin coating on a glass slide.

The above example demonstrates the ability of dimethyl glutarate to form a concentrated grind dispersion advantageously containing 55 weight percent magnetic particles. Use of dimethyl succinate and dimethyl adipate under comparable manufacturing operations has been found to similarly allow grind dispersions to be made at about 52 to 58% magnetic particles. Dibutyl phthalate, on the other hand, under comparable manufacturing operations allows grind dispersions to be made only at about 42 to 46% magnetic particles. Thus the dimethyl aliphatic esters provide about 20% productivity advantage over dibutyl phthalate solvent based dispersions.

EXAMPLE 2

Intermediate Letdown Preparation:

A 1.4 kg batch of intermediate letdown was made with the formula:

| Components | Amount (g) |
|---|---|
| Magnetic particle grind from Example 1 | 78.77 g |
| 4% cellulose triacetate in methylene chloride | 831.68 g |
| MeCl$_2$ (make-up solvent) | 489.55 g |
| Total | 1400.00 g. |

First the cellulose triacetate binder solution is poured into a 250 cc Eiger mill charged 85% volume with 1.25 mm silica quartz glass beads. The Eiger mill is then run at approx. 3,300 rpms as the concentrated magnetic particle grind is added slowly to the funnel as a 2 inch diameter Cowles disperser blade is mixing the contents. After all of the concentrate grind is added, the mill is run for 25 min. (65° F. chill water running through the jacket). The MeCl$_2$ solvent is then slowly added to the funnel with mixing and the final intermediate make-up is polished for an additional 30 min. This material is then discharged from the mill and is subsequently used in further letdowns for coating solutions.

EXAMPLE 3

Magnetic Recording Layer Coating Solution:

Based on an intermediate let-down formulated in the manner described in Example 2, a coating solution for forming a transparent magnetic recording layer was prepared with the following composition by adding additional cellulose acetate solutions, abrasive oxide (ca 0.3 diam α-alumina) dispersion, and coating aids Fluorad FC-431 (3M Corp) and make-up solvents with agitation by high speed/disperser mixers:

|  | Wt. (g) | Coating composition % | Dry Coverage (mg/ft$^2$) |
|---|---|---|---|
| Cellulose diacetate | 275.00 | 2.50 | 115.0 |
| Cellulose triacetate | 30.25 | 0.28 | 12.65 |
| Magnetic oxide particles | 13.53 | 0.12 | 5.66 |
| α-alumina abrasive particles | 8.36 | 0.08 | 3.50 |
| Fluorad FC-431 | 1.54 | 0.01 | 0.64 |
| SOLSPERSE 24000 dispersing agent | 2.02 | 0.02 | 0.85 |
| MeCl$_2$ | 7468.51 | 67.90 |  |
| Acetone | 2667.32 | 24.25 |  |
| MeOAcAc | 523.54 | 4.76 |  |
| Dimethyl glutarate | 9.92 | 0.09 |  |
| TOTALS | 11000.00 | 100.00 | 138.3 |

The coating composition is filtered on-line and pumped to a coating station where the wet lay-down is 4.6 g/ft$^2$ onto a vanadium oxide antistatic layer subbed poly(ethylene naphthalate) (PEN) 85 um thick support. This provides a magnetic recording layer coating that is about 138 mg/ft$^2$ and about 1.2 micron thick. The vanadium pentoxide containing subbing layer is described in U.S. Pat. No. 5,709,984.

A lubricating layer comprised of 50% core/50% shell particles where the core is carnauba wax and the shell is poly(methyl methacrylate-co-vinyl pyrrolidone) is coated on top of the magnetic layer, using an extrusion slot-die slide as described in U.S. Pat. Nos. 6,075,090, 6,048,677 and 6,174,661. The core-shell wax composite particle lay-down is 4 mg/ft$^2$ or 43 mg/m$^2$. The synthesis of the solvent dispersible core-shell wax particles is described in U.S. Pat. Nos. 5,695,919, 6,075,090 and 6,048,677.

A color photographic film element in accordance with the invention may be prepared using the above described magnetic recording layer coated support by applying silver halide emulsion layers and auxiliary layers as described, e.g., in Examples 5–8 of U.S. Pat. No. 5,514,528 and Examples 6–7 of U.S. Pat. No. 6,001,550 to the side of the support opposite that of the magnetic recording layer.

The preceding examples are set forth to illustrate specific embodiments of the invention and are not intended to limit the scope of the materials, processes, or combinations of the invention. Additional embodiments and advantages within the scope of the claimed invention will be apparent to one skilled in the art.

What is claimed is:

1. A concentrated fine solid particle dispersion useful for forming a substantially photographically transparent magnetic recording layer, comprising an organic solvent medium containing a dispersing agent and dispersed magnetic particles, wherein the magnetic particles are present at a concentration of at least 25% by weight and the organic solvent medium is comprised primarily of organic solvent selected from dimethyl glutarate and dimethyl adipate.

2. A dispersion according to claim 1, wherein the dispersing agent comprises a fatty acid amine, polyvinyl pyrrolidone, polyvinyl alcohol, quaternary amine, phosphoric acid ester, or polyester-polyamine.

3. A dispersion of claim 2, wherein the dispersing agent comprises a poly ($C_{2-4}$-alkyleneimine) polymeric dispersant carrying at least two mono- or poly-(carbonyl-$C_{1-7}$-alkyleneoxy) groups.

4. A dispersion according to claim 1, wherein the organic solvent medium is comprised primarily of dimethyl glutarate.

5. A dispersion according to claim 1, wherein the magnetic particle comprise Co surface treated γ-Fe$_2$O$_3$ having a specific surface area of greater than 40 m$^2$/g.

6. A dispersion according to claim 1, wherein the magnetic particles are present at a concentration of at least 49 weight percent.

7. A process for the preparation of a concentrated fine solid particle dispersion of magnetic particles in accordance with claim 1 useful for forming a magnetic recording layer, which comprises:

(a) forming a slurry of at least 25 weight percent solid magnetic particles and a dispersing agent in an organic solvent medium comprised primarily of organic solvent selected from dimethyl glutarate and dimethyl adipate; and (b) milling the slurry for a period of time sufficient to ensure that substantially no agglomerates of the magnetic particles are present.

8. A process according to claim 7, further comprising (c) mixing a solution of a film-forming polymeric binder with the milled concentrated magnetic particle dispersion to form a diluted composition comprising less than 25 weight percent magnetic particles.

9. A process according to claim 8, wherein the polymeric binder comprises a cellulose ester or mixture of cellulose esters.

10. A process according to claim 8, wherein the diluted composition comprising less than 10 weight percent magnetic particles.

11. A process according to claim 8, wherein the diluted composition comprising less than 5 weight percent magnetic particles.

12. A process for making a magnetic recording element comprising a support and a transparent magnetic recording layer coated thereon, wherein the process comprises combining a film-forming binder and a dispersion of magnetic particles in accordance with claim 1 to form a coating composition and applying said coating composition onto the support to form the transparent magnetic recording layer.

13. A process for making a photographic element comprising a photographic support, a light sensitive layer and a substantially photographically transparent magnetic recording layer, wherein the process comprises combining a film-forming binder and a dispersion of magnetic particles in accordance with claim 1 to form a coating composition and applying said coating composition onto said photographic support to form the substantially photographically transparent magnetic recording layer.

14. A process for making a photographic element according to claim 13, wherein the polymeric binder comprises a cellulose ester or mixture of cellulose esters.

* * * * *